United States Patent [19]

Sasaki et al.

[11] Patent Number: 4,520,405
[45] Date of Patent: May 28, 1985

[54] INSERT RECORDING SYSTEM FOR A VIDEO SIGNAL

[75] Inventors: Akihiko Sasaki, Hiratsuka; Kouji Arai, Tokyo; Takano Takashi; Yasuomi Namiki, both of Yokohama, all of Japan

[73] Assignee: Victor Company of Japan, Ltd., Kanagawa, Japan

[21] Appl. No.: 389,998

[22] Filed: Jun. 18, 1982

[30] Foreign Application Priority Data

Jun. 22, 1981 [JP] Japan .................................. 56-96351
Jun. 22, 1981 [JP] Japan .................................. 56-96352

[51] Int. Cl.³ ............................................ H04N 5/783
[52] U.S. Cl. ................................. 360/10.3; 360/14.1; 360/66; 360/64; 360/84
[58] Field of Search .................. 360/66, 10.3, 14.1, 360/84, 33.1, 64, 119, 121, 104, 105

[56] References Cited

U.S. PATENT DOCUMENTS

| | | | |
|---|---|---|---|
| 4,071,856 | 1/1978 | Kihara | 360/66 |
| 4,178,606 | 12/1979 | Hirota | 358/328 |
| 4,197,562 | 4/1980 | Kikuya | 360/10.3 |
| 4,293,880 | 10/1981 | Tsukada | 360/10.3 |
| 4,328,518 | 5/1982 | Kawata | 360/10.3 |
| 4,390,915 | 6/1983 | Matsuyama | 360/66 |

FOREIGN PATENT DOCUMENTS 241554 12/1964 Austria .............................. 360/14.1
2659659 1/1981 Fed. Rep. of Germany ..... 360/14.1

Primary Examiner—Alan Faber
Attorney, Agent, or Firm—Ladas & Parry

[57] ABSTRACT

In an insert recording system for a video signal, a tape is recorded with a video signal along tracks formed obliquely with respect to the longitudinal direction of the tape, a part of recorded tracks is erased, and a different or new video signal is recorded onto the erased part. The insert recording system comprises one or a plurality of video heads for recording the different or new video signal onto the erased part of the tape, one or a plurality of flying erase heads mounted on a rotary body provided with the one or a plurality of video heads, at a position leading the video head by an angle θ (in radians) with respect to the rotating direction of the video head, where the flying erase head has a track width wider than the track width of the video head, an erasing current generating circuit for generating an erasing current, a first control circuit for controlling supply of the erasing current to the flying erase head, and a second control circuit for controlling supply of the different or new video signal to video head.

13 Claims, 51 Drawing Figures

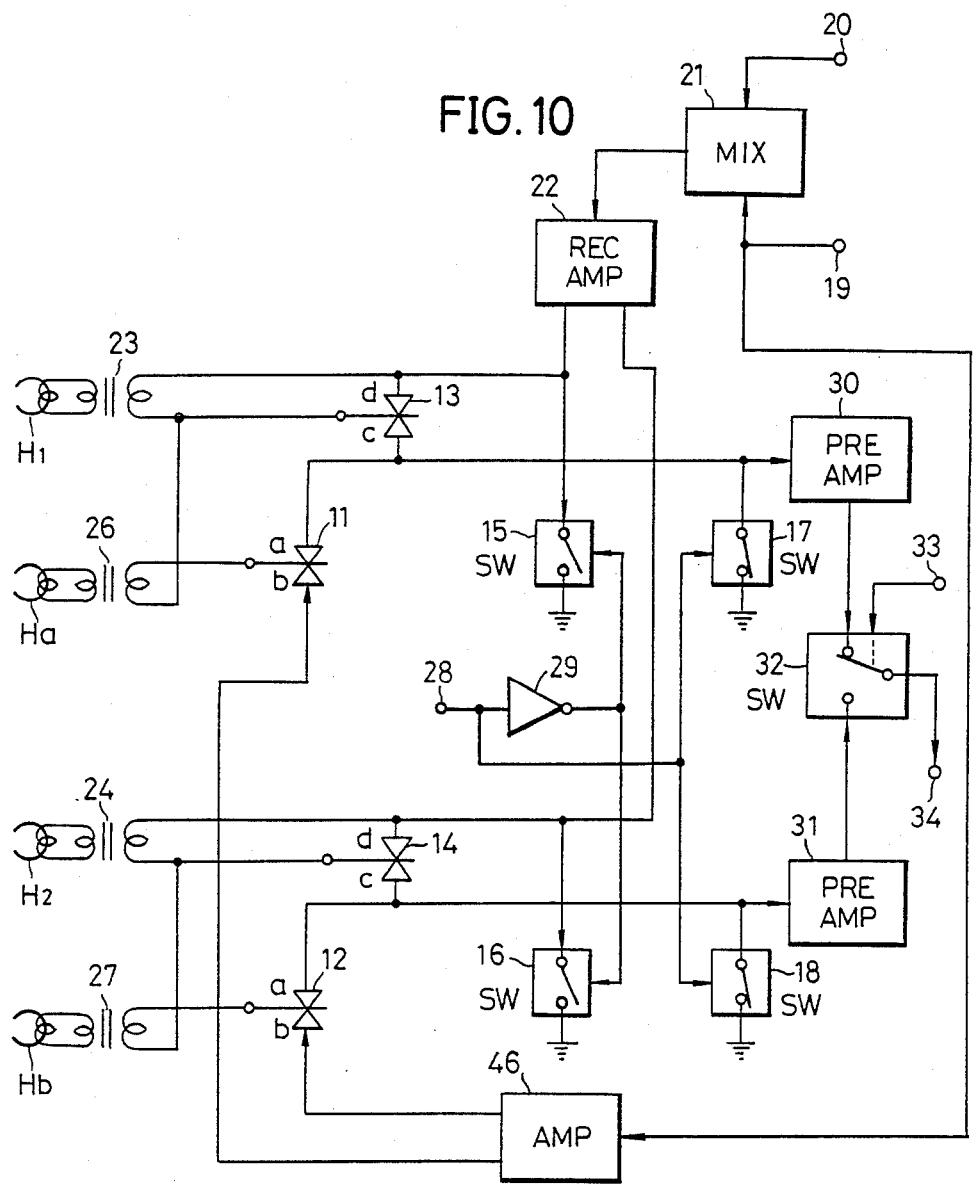
FIG. 10
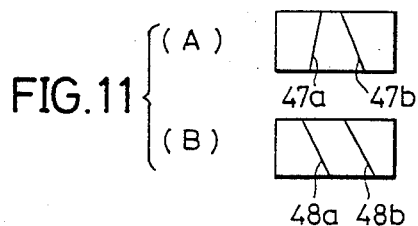
FIG. 11 { (A) / (B) }

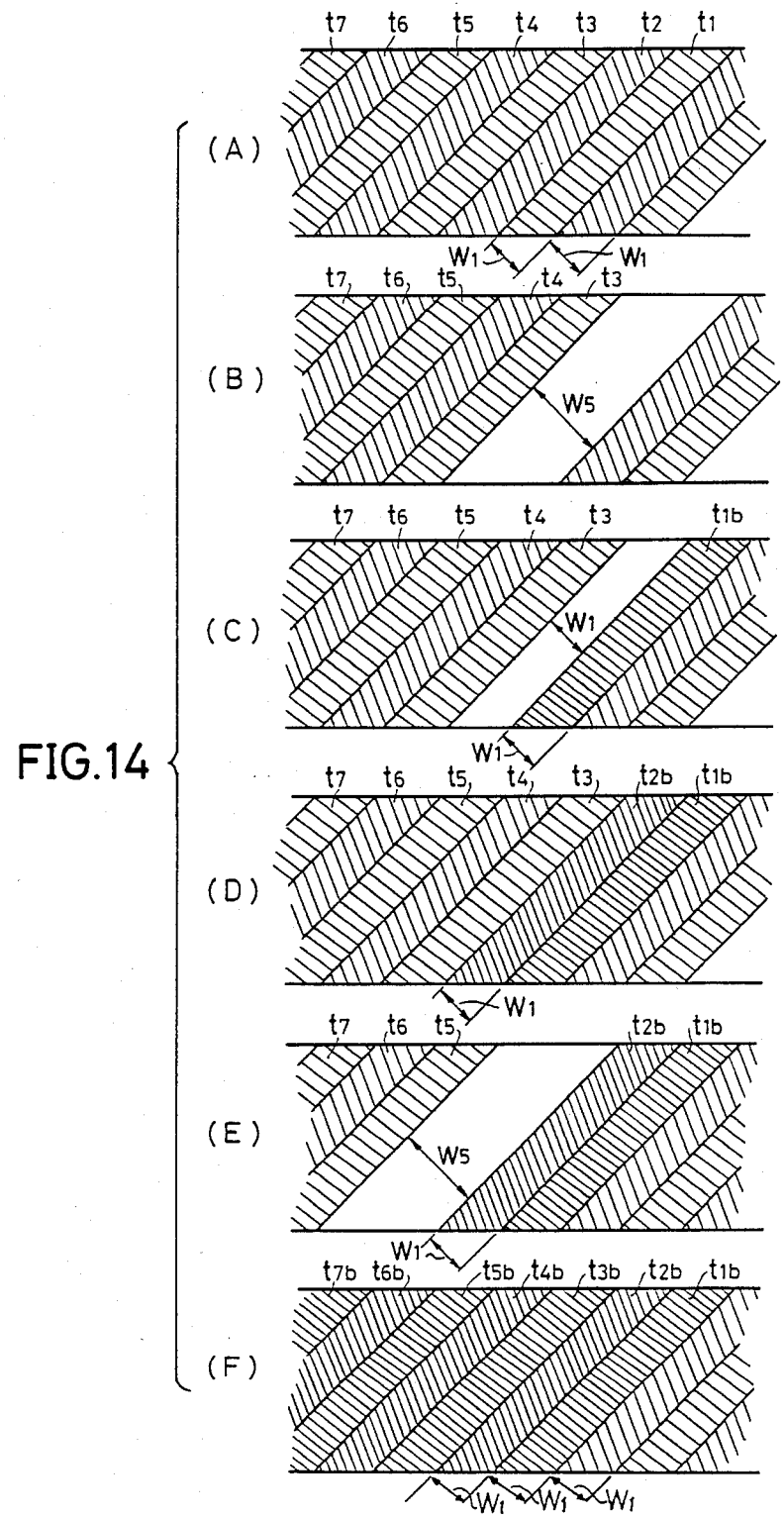

INSERT RECORDING SYSTEM FOR A VIDEO SIGNAL

BACKGROUND OF THE INVENTION

The present invention generally relates to insert recording systems for inserting and recording a new arbitrary video signal within an arbitrary section of recorded tracks among a group of video signal tracks recorded on a magnetic tape, and more particularly to an insert recording system capable of performing insert recording with a simple construction so that disturbance is not introduced in a reproduced picture at a joint between an insert recording part and a recorded track part, and so that a stable reproduced picture of high quality can be obtained.

Generally, in a recording and reproducing apparatus of the so-called helical scanning system, a video signal is recorded on a magnetic tape by one or a plurality of rotary video heads on tracks which are obliquely formed with respect to the longitudinal direction of the magnetic tape. One field of the video signal, for example, is recorded on each of the oblique tracks. When electronically editing to insert and record a new and separate video signal, instead of the recorded video signal, at an arbitrary part of the recorded magnetic tape recorded with the video signal, the recorded video track part which is to be subjected to the insert recording is normally erased before the new and separate video signal is inserted and recorded by the rotary video head.

There is a conventional system in which the erasure of the recorded video track upon insert recording is performed by a full-width erasing head. However, in this system, the full-width erasing head erases all the tracks along the width direction of the magnetic tape. Thus, the control track and the audio track were also erased instead of only erasing the video tracks which are to be erased. Accordingly, in this conventional system which uses the full-width erasing head, a control signal must be recorded onto the control track when inserting and recording the new video signal onto the erased part of the magnetic tape. But when a magnetic tape subjected to such insert recording is reproduced, the period of the control signal does not assume a predetermined constant value at the joint between the insert recording part and the recorded track part. Hence, the operation of a servo circuit which is supplied with the reproduced control signal becomes unstable at the above joint, and there is a disadvantage in that disturbance is easily introduced in the reproduced picture at the above joint.

In order to overcome the disadvantages of the above conventional system, another system was proposed in which only the video tracks to be erased are erased by a so-called flying erase head, and the new video signal is thereafter inserted and recorded onto the erased part of the magnetic tape. The above flying erase head is fixed to a rotary body such as a rotary drum onto which the rotary video head is fixed, at a position leading the rotary video head, and is a rotary head exclusively for erasure. However, in this system, because it is necessary to provide the flying erase head at a position leading the recording and reproducing rotary video head, the same number of flying erase heads is required as the number of video heads. Accordingly, the manufacturing cost increases, and the mechanical head mounting process to accurately adjust the mutual positional relationship of each head must be performed with exceedingly high accuracy. Therefore, such a system was not suited for a general recording and reproducing apparatus for home use, where there is a demand to keep the cost down to a minumum.

Furthermore, in another conventional insert recording system, the new video signal is recorded onto the recorded video track by the rotary video head according to a so-called overlap recording. In this system, the recorded video signal is erased due to the biasing effect, and the new video signal is simultaneously recorded with the erasure. According to this system, the cost of the apparatus is reduced since it is not necessary to provide a head exclusively for erasure, and moreover, disturbance is not introduced in the reproduced picture at the joint between the insert recording part and the recorded video track part because only the video track is subjected to simultaneous erasure and recording. However, in this system, the recorded video signal is erased by recording the new video signal onto the recorded video track. Therefore, there is a disadvantage in that the quality of the reproduced picture is poor at the insert recording track part.

SUMMARY OF THE INVENTION

Accordingly, it is a general object of the present invention to provide a novel and useful insert recording system for a video signal, in which the above described disadvantages have been overcome.

Another and more specific object of the present invention is to provide an insert recording system in which a head gap for special reproduction which is not used upon recording, is used as a flying erase head gap during an insert recording. According to the system of the present invention, it is unnecessary to provide a flying erase head exclusively for insert recording, because the head gap for special reproduction is used for two purposes. Thus, the cost of the apparatus can be reduced, and the insert recording can be performed without introducing degradation in the reproduced picture.

Still another object of the present invention is to provide an insert recording system in which the track width of a flying erase head is selected to an integral multiple equal to or over twice the track pitch of the recorded video track, and the insert recording is continued by the rotary video head for a predetermined time from a point where the erasure of the recorded video tracks by the flying erase head is terminated upon termination of the insert recording. According to the system of the present invention, the number of flying erase heads may be less than the number of recording and reproducing rotary video heads because the flying erase head simultaneously erases a plurality of recorded video tracks. In addition, the insert recording can be performed without introducing an unrecorded part between the insert recording part where the insert recording is terminated and the recorded video track part.

Another object of the present invention is to provide an insert recording system in which a lower end position of the flying erase head provided at a position leading with respect to the rotary video head or the head gap for special reproduction operated as the flying erase head, is shifted towards the direction of the track width by a value related to the track pitch of the recorded video track and the leading angle, so that the lower end of a scanning locus of the above flying erase head and the like coincides with the lower end of the recorded video track. According to the system of the present invention, video tracks can be recorded contiguously without guard bands by the insert recording.

Still another object of the present invention is to provide an insert recording system in which the flying erase head or the head gap for special reproduction is mounted at a height position different from that of the recording and reproducing rotary video head, and the starting or stopping of the erasing operation by the flying erase head or the head gap for special reproduction leads the start or the termination of the recording by the rotary video head upon starting or termination of the insert recording. According to the system of the present invention, insert recording can be performed so that overlap or breaks are not introduced between the starting point of the insert recording and the recorded track part and between the terminal point of the insert recording and the recorded track part. Moreover, the insert recording can be performed so that the picture does not change within one field.

Other objects and further features of the present invention will be apparent from the following detailed description when read in conjunction with the accompanying drawings.

BRIEF DESCRIPTION OF THE DRAWINGS

FIG. 10 is a system block diagram showing the second embodiment of an insert recording system for a video signal according to the present invention;

FIGS. 11(A) and 11(B) respectively show other embodiments of the heads;

FIGS. 14(A) through 14(F) respectively show a manner in which a track pattern is formed by insert recording performed by the heads shown in FIGS. 12 and 13;

DETAILED DESCRIPTION

Figure 1:
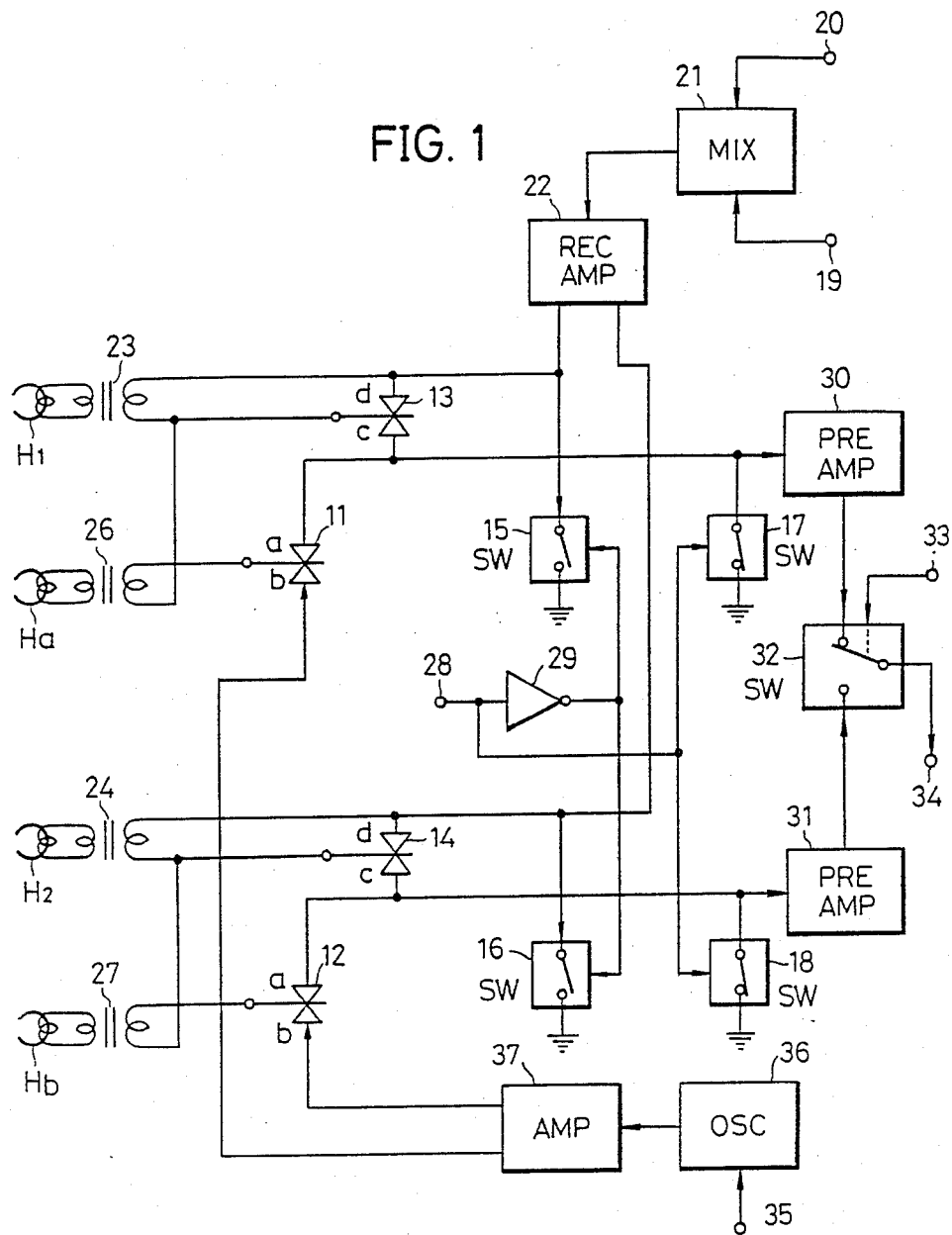
FIG. 1 is a system block diagram showing a first embodiment of an insert recording system for a video signal according to the present invention.

First, description will be given with respect to the operation of the system according to the present invention upon recording. In FIG. 1, relays 11 and 12 are respectively connected to the side of a contact a, and relays 13 and 14 are respectively connected to the side of a contact c upon recording. Switches 15 and 16 are in OFF states, and switches 17 and 18 are in ON states. When the switches 17 and 18 are turned ON, input sides of magnetic heads Ha and Hb for special reproduction which will be described hereinafter are short-circuited, and these magnetic heads Ha and Hb are put into non-operational states.

A color video signal which is to be recorded, is separated into a luminance signal and a carrier chrominance signal. The separated luminance signal is frequency-modulated, and supplied to a mixing circuit 21 from an input terminal 19. On the other hand, the separated carrier chrominance signal is frequency-converted into a signal occupying a band lower than the band of the above frequency-modulated luminance signal according to a process such as that disclosed in the U.S. Pat. No.4,178,606 in which the assignee is the same as that of the present application. The frequency-converted carrier chrominance signal is supplied to the mixing circuit 21 from an input terminal 20. The above frequency-modulated luminance signal and the frequency-converted carrier chrominance signal are subjected to frequency-division multiplexing at the mixing circuit 21. An output multiplexed signal of the mixing circuit 21 is supplied in two branches through a recording amplifier 22. The above multiplexed signal is supplied to a normal rotary video head H1 through a rotary transformer 23. On the other hand, the multiplexed signal is also supplied to a rotary video head H2 through a rotary transformer 24.

Figure 2:
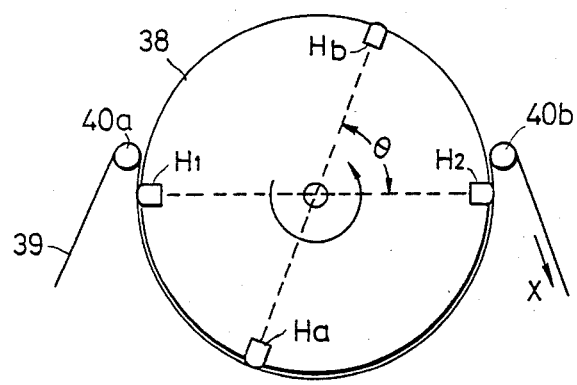
FIG. 2 is a plan view showing mounting positions of heads on a rotary drum, in the first and second embodiments of an insert recording system of a video signal according to the present invention.

Next, description will be given with respect to the relationship between the relative mounting positions of the video heads H1 and H2 and the magnetic heads Ha and Hb for special reproduction. As shown in FIG. 2, the video heads H1 and H2 are fixed onto a rotary body 38 in a state opposing each other with an angle of 180° formed therebetween. The magnetic head Ha is fixed onto the rotary body 38 in a state leading the video head H1 by an angle $\theta$ (70°, for example) with respect to the rotating direction of the rotary body 38. In addition, the magnetic head Hb is fixed onto the rotary body 38 in a state leading the video head H2 by the angle $\theta$.

The video heads H1 and H2 have the same track width W1 (49 $\mu$m, for example). These video heads H1 and H2 have gaps inclined by an angle $\alpha$ (6°, for example) in mutually opposite directions with respect to a direction perpendicular to the scanning direction, that is, the gaps respectively have a mutually opposite azimuth angle $\alpha$. On the other hand, the magnetic heads Ha and Hb respectively have a track width W2 (79 $\mu$m, for example) which is larger than the track width W1. The azimuth angles of the gaps of the magnetic heads Ha and Hb are the same, and are selected to an azimuth angle equal to the azimuth angle in one of the video heads H1 and H2.

Figure 3:
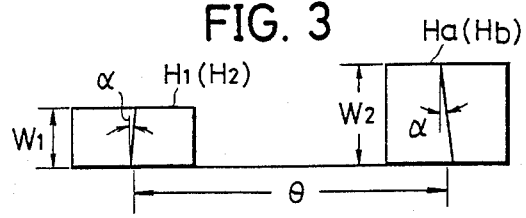
FIG. 3 shows a positional relationship of the mounting height of the head with respect to the rotary drum in the first embodiment of an insert recording system for a video signal according to the present invention.
Figure 6:
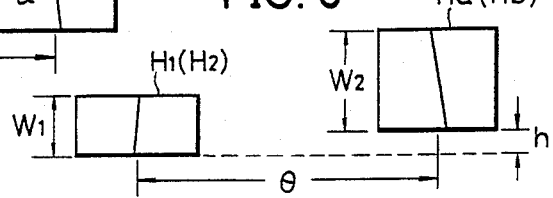
FIG. 6 shows a positional relationship of the mounting height of the head with respect to the rotary drum in the second embodiment of an insert recording system for a video signal according to the present invention.

In the first embodiment of the invention, the relationship between the relative height positions of the video heads H1 and H2 and the magnetic heads Ha and Hb, becomes as shown in FIG. 3 wherein the lower end surface positions of the heads are aligned. Further, in the second embodiment of the present invention, the magnetic heads Ha and Hb are mounted at positions higher than the video heads H1 and H2 by a distance h, as shown in FIG. 6.

A magnetic tape 39 is guided by guide poles 40a and 40b and wound around the rotary body 38 shown in FIG. 2 and makes contact with the rotary body 38 for an angular range slightly over 180°. The magnetic tape 39 travels in the direction of an arrow X, and is alternately scanned by the video heads H1 and H2 rotating counterclockwise. Accordingly, video tracks t1, t2, t3, . . . having the track width W1 are successively formed obliquely with respect to the longitudinal direction of the magnetic tape 39. Here, the tracks t1, t3, t5, t7, . . . (odd numbered tracks) having the track width W1 are formed by the video head H1, while the tracks t2, t4, t6, . . . (even numbered tracks) having the track width W1 are formed by the video head H2. Each of the tracks t1, t2, t3, . . . are contiguously formed without a gap formed therebetween. In addition, substantially one field of video signal is recorded in each of the tracks t1, t2, t3, . . . .

Next, description will be given with respect to the operation of the system upon normal reproduction. During normal reproduction, the relays 11 through 14 are in the same connection states as upon recording. The switches 15 and 16 are turned ON, and the switches 17 and 18 are turned OFF. Hence, the signal alternately reproduced from the magnetic tape 39 by the video heads H1 and H2, is supplied to a switching circuit 32, through the rotary transformers 23 and 24, the relays 13 and 14, and preamplifiers 30 and 31 shown in FIG. 1. A square wave in phase synchronism with the rotation of the rotary body 38 shown in FIG. 2, is supplied to the switching circuit 32 as a switching signal, from an input terminal 33. During a period when the video head H1 is scanning over the magnetic tape 39, the output signal of the preamplifier 30 is selectively produced through an output terminal 34. On the other hand, during a period when the video head H2 is scanning over the magnetic tape 39, the output signal of the preamplifier 31 is selectively produced through the output terminal 34. The magnetic heads Ha and Hb are short-circuited and do not operate upon normal reproduction.

Description will now be given with respect to the operation of the system upon special reproduction such as slow-motion reproduction and still picture reproduction, wherein the magnetic tape is caused to travel at a speed different from the tape speed upon recording or the magnetic tape travel is stopped. During special reproduction, the relays 13 and 14 are respectively connected to the side of a contact d, while the relays 11 and 12 and the switches 15 through 18 are in the same states as those upon normal reproduction. Although the video heads H1 and H2 respectively are short-circuited through the switches 15 and 16 and become non-operational due to the switching of the connection in the relays 13 and 14 to the side of the contact d, the magnetic heads Ha and Hb are respectively connected to the preamplifiers 30 and 31 through the switches 30 and 31. Accordingly, the signal alternately reproduced by the magnetic heads Ha and Hb from the magnetic tape 39, is supplied to the switching circuit 32 through the preamplifiers 30 and 31. The output of the switching circuit 32 is selectively produced through the output terminal 34. The magnetic heads Ha and Hb are wider than the track width W1 of the recorded video tracks on the magnetic tape 39, and have gaps of the same azimuth angle. Thus, if the magnetic tape travel is stopped to perform still picture reproduction, for example, the magnetic head repeatedly reproduces only the tracks recorded by the video head having a gap with the same azimuth angle as this reproducing magnetic head. A still reproduced picture is accordingly obtained, wherein a completely still picture is obtained from the same field. In addition, even during a slow-motion reproduction or a quick-motion reproduction, the magnetic head can scan over the video tracks recorded by the video head having a gap with the same azimuth angle as this reproducing magnetic head with a large effective scanning area, because the magnetic heads Ha and Hb are wider than the track width W1 of the video tracks. Signals from the video tracks recorded by the video head having a gap with a different azimuth angle from reproducing magnetic head, are hardly reproduced due to the azimuth loss effect. Therefore, it is possible to obtain a reproduced picture with very little noise during special reproduction.

Next, description will be given with respect to the operation of the system during insert recording. During insert recording, the switches 17 and 18 are turned ON by a signal applied to an input terminal 28 in FIG. 1, and the switches 15 and 16 are turned OFF by an output signal of an inverter 29. Moreover, the relays 13 and 14 are respectively connected to the side of the contact c, and the relays 11 and 12 are respectively connected to the side of a contact b. When an insert recording starting signal is applied to an input terminal 35, an erasing current oscillator 36 starts to operate. The oscillator 26 generates an erasing current of a predetermined frequency, and supplies this erasing current to an erasing current amplifier 37. This erasing current is supplied to the magnetic head Ha through the relay 11 and a rotary transformer 26. On the other hand, the erasing current is also supplied to the magnetic head Hb through the relay 12 and a rotary transformer 27. The magnetic heads Ha and Hb erase the video tracks recorded on the magnetic tape 39, by use of the above erasing current.

Figure 4:
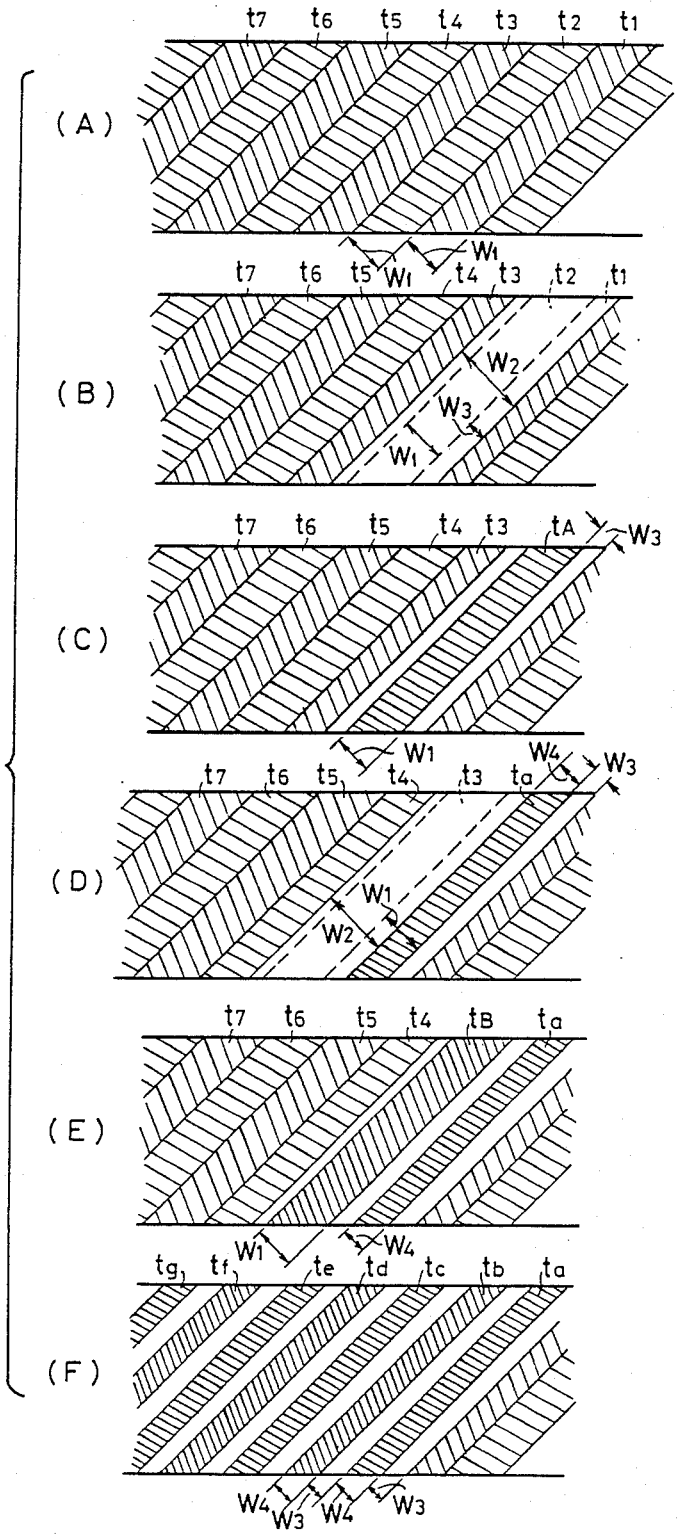
FIGS. 4(A) through 4(F) respectively show a manner in which a track pattern is formed by insert recording performed by the heads shown in FIGS. 2 and 3.

If the magnetic heads Ha and Hb are mounted on the rotary body 38 so that the lower ends coincide with respect to the video heads H1 and H2 as shown in FIG. 3, the magnetic head Hb erases the entire video track t2 and a part of the video tracks t1 and t3 as shown in FIG. 4(B), for example, among the tracks on the magnetic tape 39 shown in FIG. 4(A). The erased width of the video track t1 is indicated by W3 in FIG. 4(B). The erased width W3 can be defined by the following equation, because the magnetic head Hb leads the video head H2 which records and forms the video track t2 by an angle $\theta$.

$$W3 = TP \cdot \theta/\pi$$

In the above equation, TP indicates the track pitch, and TP is equal to W1 in this case. Accordingly, is W1=49 $\mu$m, and $\theta = 70° = 0.389\pi$ (rad.), for example, W3 becomes as follows.

$$W3 = 49 \times 0.389\pi/\pi = 19.1 \ (\mu m)$$

Therefore, the erased width of the video track t3 becomes equal to W2−(W1+W3), and is equal to 10.9 $\mu$m if W2 is equal to 79 $\mu$m.

Next, at the erased part of the video track t2, the video head H2 records the new video signal along a track tA by insert recording, as shown in FIG. 4(C). After the video head H2 records the track tA (or strictly speaking, while the video head H2 is recording the track tA), the magnetic head Ha begins to scan over the magnetic tape 39. As a result, the entire track t3 and a part of the track tA and t4 are erased as shown in FIG. 4(D). The erased width of the track tA is W3, and the insert recording track ta having a width W4 remains without being erased. Before erasure with respect to the track width W2 by the magnetic head Ha is completed, the video head H1 records the new video signal along a track tB having a track width W1 by insert recording, as shown in FIG. 4(E). Accordingly, the recorded video track t3 is erased, and the video track tB is recorded and formed.

Then, when the above track tB is recorded, the magnetic head Hb effects erasure of a track width W2. By repeatedly performing the above described operations, insert recording tracks ta, tb, tc, td, te, tf, tg, ... having a track width W4 are successively formed with a guard band of a width W3 formed therebetween, as shown in FIG. 4(F). The above track width W3 is equal to W1−W3. Thus, if W1=49 $\mu$m and W3=19.1 $\mu$m, for example, W4=29.9 $\mu$m.

According to the present embodiment of the invention, the magnetic heads Ha and Hb are used as flying erase heads upon insert recording. This enables insert recording of the new video signal along video tracks having a track width W4.

Figure 5:
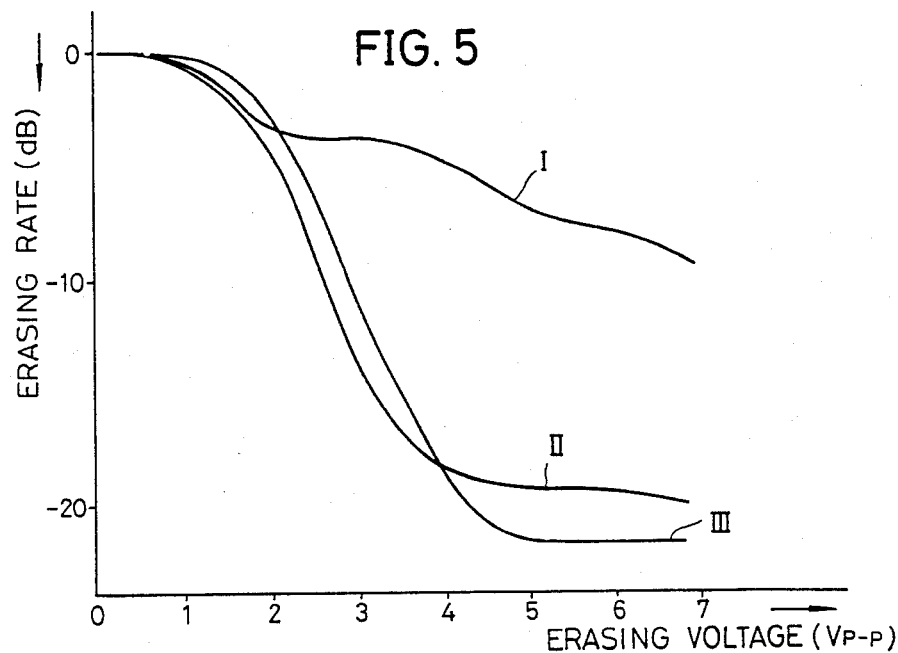
FIG. 5 is a graph showing an erasing voltage versus erasing rate characteristic with an erasing current frequency as the parameter.

Next, description will be given with respect to an erasing current supplied to the magnetic heads Ha and Hb. In FIG. 5, the horizontal axis indicates the erasing voltage at terminals of the rotary transformer, and the vertical axis indicates the erasing rate. Curves I, II, and III respectively indicate the erasing voltage versus erasing rate characteristics for cases when the erasing current frequencies are 6 MHz, 8 MHz, and 10 MHz. As clearly seen from FIG. 5, in the case where the erasing current frequency is 6 MHz as shown by the curve I, the erasing rate is low, and this condition is undesirable in that the erasing current will be recorded. On the other hand, when the erasing current frequency is 8 MHz and 10 MHz as shown by the curves II and III, an erasing rate in the order of 20 dB can be obtained in both cases, and the erasing current will not be recorded and reproduced under these conditions. However, when the erasing voltage is in the range of 5 Vp-p (peak-to-peak) to 7 Vp-p, a better erasing rate is obtained for the case where the erasing current frequency is 10 MHz than in the case where the erasing current frequency is 8 MHz. It has been experimentally confirmed that if the erasing current frequency is increased unnecessarily, the erasing voltage for obtaining the same erasing rate increases due to increase in the impedance, loss, and the like. Therefore, best results are obtained when the erasing current frequency is in the range of 10 MHz.

Description will now be given with respect to the operation of the second embodiment of the invention upon insert recording. In this second embodiment of the invention, the magnetic heads Ha and Hb are arranged on the rotary body 38 at positions relatively higher than the video heads H1 and H2 by the distance h, as shown in FIG. 6. In FIG. 6, the distance h is selected so as to satisfy the following equation.

$$h = TP \cdot \theta/\pi$$

If the track pitch TP is 49 $\mu$m and the angle $\zeta$ is $0.389\pi$ radians (=70°) as in the above described case, h becomes equal to 19.1 $\mu$m.

Figure 7:
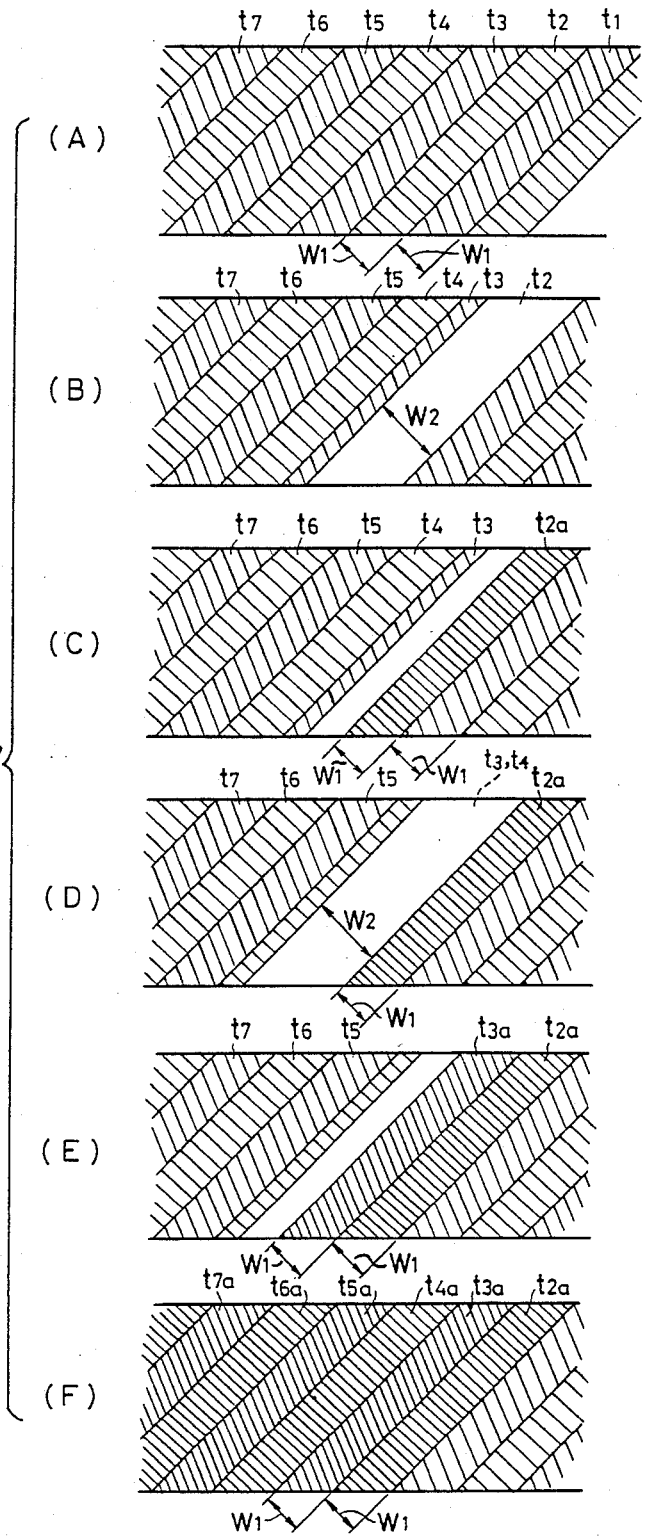
FIGS. 7(A) through 7(F) respectively show a manner in which a track pattern is formed by insert recording performed by the heads shown in FIGS. 2 and 6.

With respect to the magnetic tape having a tape pattern shown in FIG. 7(A) wherein video tracks having a track width W1 are contiguously recorded, the magnetic head Hb erases the entire video track t2 and a part of the video track t3 to effect erasure of a width W2 as shown in FIG. 7(B). Here, the lower end of the scanning locus of the magnetic head Hb coincides with the border line between the video tracks t1 and t2. Thus, a width W2−W1 of the video track t3 is erased. Before the erasure by the magnetic head Hb is completed, the video head H2 begins to scan over the magnetic tape 39. The new video signal which is to be recorded, is recorded by the video head H2 along a track t2a having a track width W1 by insert recording, as shown in FIG. 7(C). Next, the entire video track t3 and a part of the video track t4 are erased by the magnetic head Ha as shown in FIG. 7(D). Because the magnetic head Ha is mounted at a position higher than the video head H1 by the distance h, the lower end of the scanning locus of the magnetic head Ha coincides with the lower end of the scanning locus of the video head H1 which performs the next scan, that is, coincides with the border line between the video tracks t2a and t3. Hence, even when the magnetic head Ha effects erasure, the insert recording track t2a will not be erased, and the whole track width W1 of this insert recording track t2a will remain.

Before the above erasure by the magnetic head Ha is terminated, the video head H1 effects insert recording by recording the new video signal along a track t3a having a track width W1, contiguously with respect to the track t2a having the track width W1, as shown in FIG. 7(E). Thereafter, the erasure by the magnetic heads Ha or Hb, and the insert recording of the new video signal by the video heads H1 and H2, are alternately and repeatedly performed in a similar manner. Accordingly, insert recording tracks t4a, t5a, t6a, t7a, . . . respectively having a track width W1, are successively recorded and formed contiguously without formation of guard bands, as shown in FIG. 7(F). The tracks formed by the insert recording are in contiguous contact with each other according to the present embodiment, and therefore, the tape utilization efficiency is improved over the first embodiment shown in FIG. 3.

Figure 8:
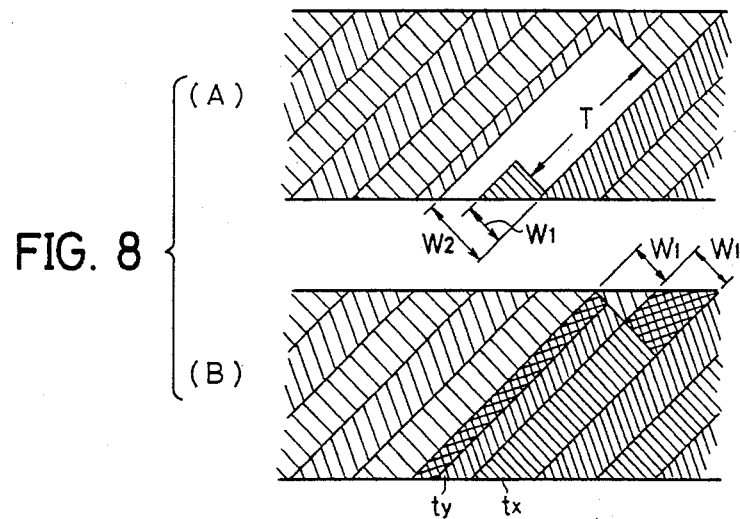
FIGS. 8(A) and 8(B) respectively show an example of a track pattern at a point when the insert recording performed by the heads shown in FIGS. 2 and 6 is terminated.

However, in the above second embodiment of the invention, an unrecorded part will be formed for a range of at least a length T and a track width W2 as shown in FIG. 8(A), if the erasure by the magnetic heads Ha and Hb and the recording of the video signal by the video heads H1 and H2 are terminated simultaneously. The unrecorded part is formed due to the differences in height position and track width of the magnetic heads Ha and Hb and the video heads H1 and H2. When a magnetic tape subjected to the insert recording and having such unrecorded part is reproduced, no picture will be obtained at this unrecorded part, and considerable degradation is introduced in the quality of the reproduced picture.

Figure 9:
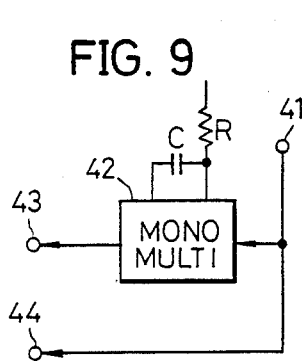
FIG. 9 is a circuit diagram showing an embodiment of an essential part of the system according to the present invention used when performing insert recording by the heads shown in FIGS. 2 and 6.

Accordingly, a recording and reproducing apparatus having the head arrangement shown in FIG. 6 is constructed so that the recording of the video signal is continued for a period of (1+T) fields after the erasure by the magnetic heads Ha and Hb is terminated, by use of a circuit shown in FIG. 9. In FIG. 9, an insert recording control signal applied to a terminal 41, is produced through the output terminal 28 as a signal for controlling the erasing current supplied to the magnetic heads Ha and Hb. On the other hand, the insert recording control signal is also supplied to a monostable multivibrator 41 wherein the signal is delayed by a predetermined delay time determined by values of a capacitor C and a resistor R, that is, delayed by (1+T) field period, and then produced through an output terminal 43. The signal obtained from the output terminal 43 effects continuation of the recording mode state of the video heads H1 and H2, for the (1+T) field period.

The above length T can be described by $\theta/\pi$. The angle $\theta$ is the leading angle of the magnetic heads Ha and Hb with respect to the video heads H1 and H2, and $\theta = 0.389\pi$ radians ($=70°$) in the present embodiment. By continuing the recording of the video signal for $(1+\theta/\pi)$ field period even after completion of the erasure by the magnetic heads Ha and Hb, the tape pattern becomes as shown in FIG. 8(B) wherein tracks tx and ty are recorded and formed and there is no unrecorded part. In FIG. 8(B), the cross-hatched part indicates a part where the new video signal is recorded over the recorded track by insert recording.

When the magnetic heads Ha and Hb are arranged at positions higher than the video heads H1 and H2 by the distance h as shown in FIG. 6, the switching timing of the reproduced outputs from the magnetic heads Ha and Hb upon special reproduction, must be changed to a faster timing compared to the case shown in FIG. 3. For example, if the distance h is 19.1 μm, the diameter of the rotary body 38 shown in FIG. 2 is 62 mm, and the inclined angle of the video tracks with respect to the longitudinal direction of the magnetic tape 39 is 5.96°, the above switching timing must be increased by:

$$\left\{ \left( \frac{0.0191}{\tan 5.96°} \right) \div 62\pi \right\} \times 360 = 0.34°$$

However, a deviation in the order of 0.34° is within the allowable switching range, and no problems will be introduced from the practical point of view even if the switching timing is not increased.

As shown in FIG. 2, the heads Ha and H1 and the heads Hb and H2 are respectively provided with an angle $\theta$ formed therebetween, where $\theta$ is an angle less than 180°. Hence, there actually is a period in which the erasure by the magnetic heads Ha and Hb and the video signal recording by the video heads H1 and H2 are performed simultaneously. Accordingly, in reality, the tape patterns shown in FIGS. 4(B) through 4(E) or FIGS. 7(B) through 7(E) are not formed. That is, in FIGS. 4(A) through 4(F) and FIGS. 7(A) through 7(F), only a part of the track is shown for the purpose of simplifying the explanation on the operating principle of the insert recording. However, the track patterns shown in FIGS. 4(F) and 7(F) are still obtained as a result of the insert recording.

Next, description will be given with respect to the signal processing system in the second embodiment of the insert recording system according to the present invention, by referring to FIG. 10. In FIG. 10, those parts which are the same as those corresponding parts in FIG. 1 are designated by the same reference numerals, and their description will be omitted. In the present embodiment of the invention, the frequency-modulated luminance signal applied to the input terminal 19, is directly supplied to an amplifier 46 as an erasing current. This construction eliminates the need for the erasing current oscillator 36. Accordingly, in the present embodiment, erasure is effected by recording the frequency-modulated luminance signal. Because the frequency-modulated luminance signal is a high-frequency signal, the frequency-modulated luminance signal is superficially recorded in the magnetic layer of the magnetic tape. On the other hand, the low-band-converted carrier chrominance signal is a low-frequency signal, and is recorded deeply in the magnetic layer, that is, the signal deeply penetrates the magnetic layer upon recording. It is known that when a signal is recorded over the recorded signal, the recorded signal is easily erased if the recorded signal is the frequency-modulated luminance signal, and not easily erased if the recorded signal is the low-band-converted carrier chrominance signal.

Accordingly, if only the frequency-modulated luminance signal is used as the erasing current and recorded over the recorded track to effect erasure, and the new video signal is recorded onto the erased track by insert recording as in the present embodiment, the picture quality is greatly improved. However, in this case, the adjustment of the height of the magnetic heads Ha and Hb and the control with respect to the timing upon termination of the insert recording, are essential.

Description was given above on the assumption that the magnetic heads Ha and Hb have an erasing function upon insert recording. However, double head gaps 47a and 47b or 48a and 48b may be provided on a single head, as shown in FIGS. 11(A) and 11(B). In this case, the head can assume an erasing function upon insert recording, by using the head gaps 47b and 48b for special reproduction which are of the same azimuth angle.

Figure 12:
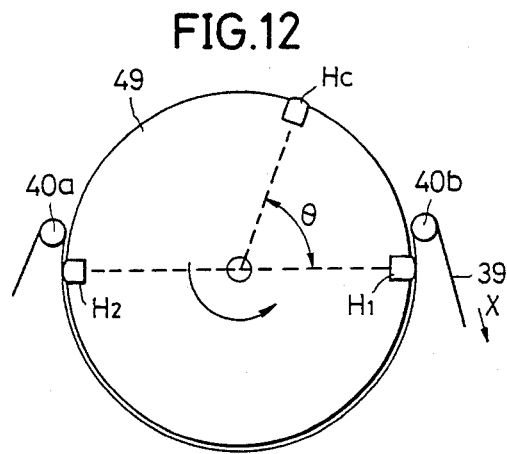
FIG. 12 is a plan view showing the mounting positions of the heads on the rotary drum in a third embodiment of an insert recording system for a video signal according to the present invention.

Next, description will be given with respect to a third embodiment of an insert recording system. In FIG. 12, the video heads H1 and H2 are provided on a rotary body 49 in a mutually opposing state. These video heads have the same track width W1, and have gaps with mutually different azimuth angles. A flying erase head Hc is also provided on the rotary body 49. This flying erase head is provided at a position on the rotary body 49, leading the video head H1 by an angle $\theta$ ($\theta = 70°$, for example) with respect to the rotating direction of the rotary body 49. In addition, the magnetic tape 39 is guided by the guide poles 40a and 40b and wound around the rotary body 49, so that the magnetic tape 39 makes contact with the rotary body 49 throughout an angular range slightly over 180°. The magnetic tape 39 travels in the direction of the arrow X, and the rotary body 49 rotates counterclockwise.

Figure 13:
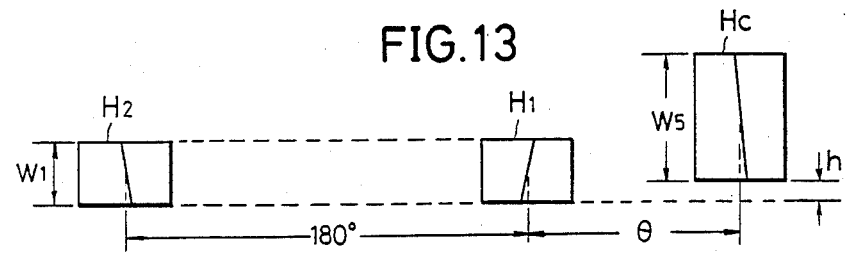
FIG. 13 shows a positional relationship of the mounting height of the head with respect to the rotary drum in the third embodiment of an insert recording system for a video signal according to the present invention.

As shown in FIG. 13, the flying erase head Hc is mounted on the rotary body 49 at a height position higher than the height position of the video heads H1 and H2 by a distance h. Furthermore, a track width W5 of the flying erase head Hc is selected to an integral multiple equal to or over twice the recording track pitch. Here, the track width W5 is twice the recording track pitch, for example. The distance h is the same as the distance h in the above described case, and is 19.1 μm, for example.

Description will now be given with respect to the operation of the system using the heads H1, H2, and Hc upon insert recording. The magnetic tape 39 onto which the video tracks t1, t2, t3, t4, t5, t6, ... respectively having a track width W1 are recorded and formed contiguously as shown in FIG. 14(A), is caused to travel at the same speed as upon normal recording, and the rotary body 49 is simultaneously rotated at the same speed as upon normal recording or reproduction. In this state, the flying erase head Hc simultaneouly scans over the video tracks t1 and t2 to erase these tracks t1 and t2 as shown in FIG. 14(B). That is, because the track width W5 of the flying erase head Hc is equal to 2W1 and the head Hc is provided at a height position higher than the video heads H1 and H2 by the distance h which is related to the leading angle $\theta$, the lower end of the scanning locus of the head Hc which leads the scanning with respect to the video head H1 coincides with the lower end of the scanning locus of the video head H1. This is the reason why the video tracks t1 and t2 can be erased simultaneously.

Then, the video head H1 begins to scan over the magnetic tape 39, to record the new video signal along a recording track t1b by insert recording, as shown in FIG. 14(C). When the recording of the insert recording track t1b is terminated, the video head H2 immediately begins to record an insert recording track t2b as shown in FIG. 14(D). Since the head Hc begins to make contact with the magnetic tape 39 while the insert recording track t2b is being recorded, the head Hc effects erasure of the recorded video tracks t3 and t4 at the same time the video head H2 records the insert recording track t2b. FIG. 14(E) shows a track pattern for the case where the erasure of the recorded video tracks t3 and t4 by the head Hc is completed. Actually, the recording of the insert recording track t2b by the video head H2 is completed while the head Hc effects erasure of the recorded video tracks t3 and t4, and the recording of an insert recording track t3b is started by the video head H1 from the point when the recording of the insert recording track t2b is completed. Accordingly, in reality, the track patterns shown in FIGS. 14(B) through 14(E) are not obtained, because FIGS. 14(B) through 14(E) merely show the process of insert recording in principle.

The above described operations are repeatedly performed. As a result, insert recording tracks t1b, t2b, t3b, t4b, t5b, t6b, ... respectively having a track width W1 are recorded and formed contiguously, as shown in FIG. 14(F).

In the present embodiment, the flying erase head Hc leads the video heads by an angle $\theta$ or $(180° + \theta)$. Moreover, the head Hc is constructed to simultaneously erase two recorded video tracks. Thus, if the operations of the head Hc and the video heads H1 and H2 terminate simultaneously, an unrecorded part of a length T ($= \theta/\pi$ fields) will be formed on the magnetic tape as indicated by e in FIG. 15(A), similarly as in the case shown in FIG. 8(A).

Figure 16:
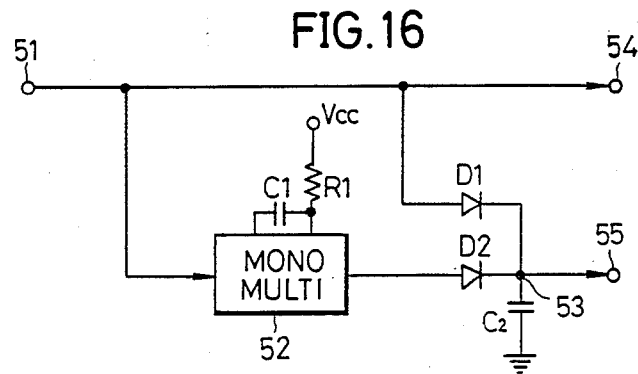
FIG. 16 is a circuit diagram showing an embodiment of an essential part of the system according to the present invention used when performing insert recording by the heads shown in FIGS. 12 and 13.

Hence, it becomes necessary to effect control by a circuit shown in FIG. 16, so as to record a signal in the above unrecorded part. In FIG. 16, an insert recording control signal shown in FIG. 17(A) which is applied to an input terminal 51, is produced through a terminal 54 as an erasure control signal shown in FIG. 17(B). This erasure control signal controls the erasing current supplied to the flying erase head Hc. On the other hand, the above insert recording control signal is supplied to a monostable multivibrator 52. The monostable multivibrator 52 is triggered by a fall in the insert recording control signal, and generates a square wave shown in FIG. 17(C). The square wave generated by the monostable multivibrator 52 is a single pulse having a pulse width TW which is determined by a time constant obtained according to the values of a capacitor C1 and resistor R1. The pulse width TW corresponds to $(1 + \theta/\pi)$ fields. For example, C1 = 56,000 pF and R1 = 500 k$\Omega$.

Figure 17:
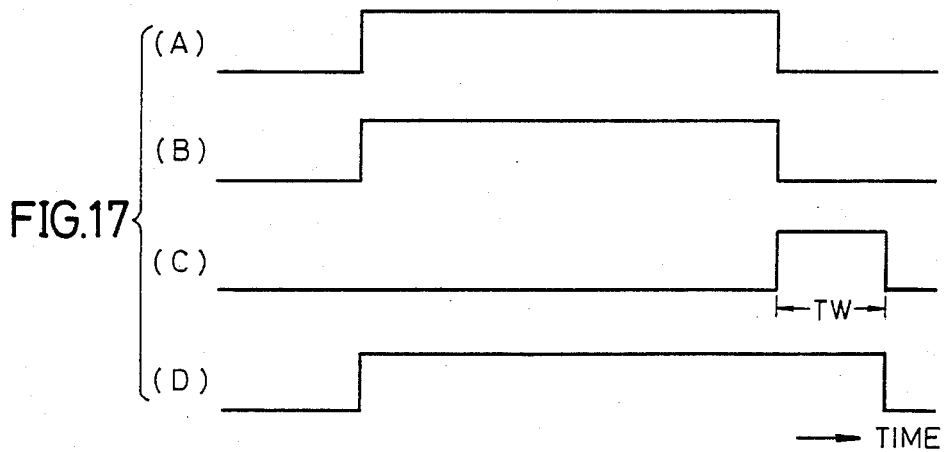
FIGS. 17(A) through 17(D) respectively are time charts for explaining the operation of the circuit shown in FIG. 16.

The above square wave from the monostable multivibrator 52 passes through a diode D2, and is added to the insert recording control signal passed through a diode D1, at a point 53. Accordingly, a signal shown in FIG. 17(D) is produced through an output terminal 55. A capacitor C2 is provided to prevent generation of noise at the joint between the above square wave and the insert recording control signal. The control signal produced through the output terminal 55 is a signal for controlling and putting the video heads H1 and H2 in the recording mode.

Figure 15:
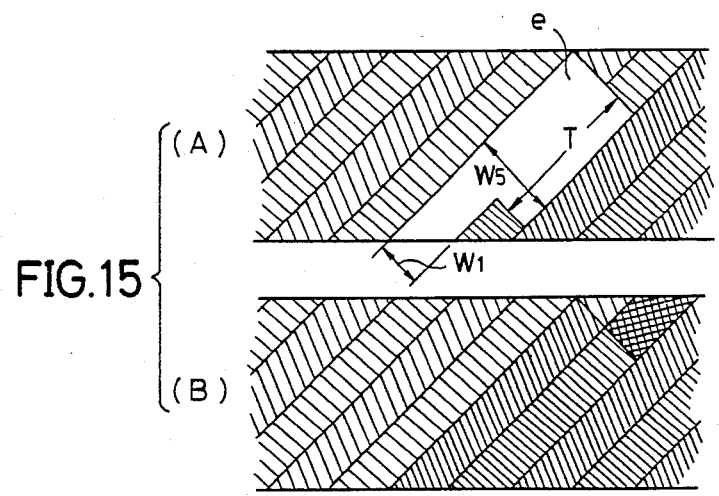
FIGS. 15(A) and 15(B) respectively show an example of a track pattern at a point when the insert recording performed by the heads shown in FIGS. 12 and 13 is terminated.

By use of the circuit shown in FIG. 16, the video heads H1 and H2 continue the insert recording for $(1 + \theta/\pi)$ fields after the operation of the flying erase head Hc terminates, upon termination of the insert recording. Thus, the recording tracks are formed as shown in FIG. 15(B), and the unrecorded parts are prevented from being formed.

However, in the present embodiment of the invention, the tape pattern becomes irregular in that the recorded video track and the insert recording track overlap and the picture changes in the middle of one field. Further, if the heads H1, H2, and Hc receive instructions to start the insert recording in the middle of a recorded video field, the picture will change within the same one field, and the tape pattern becomes irregular.

Figure 18:
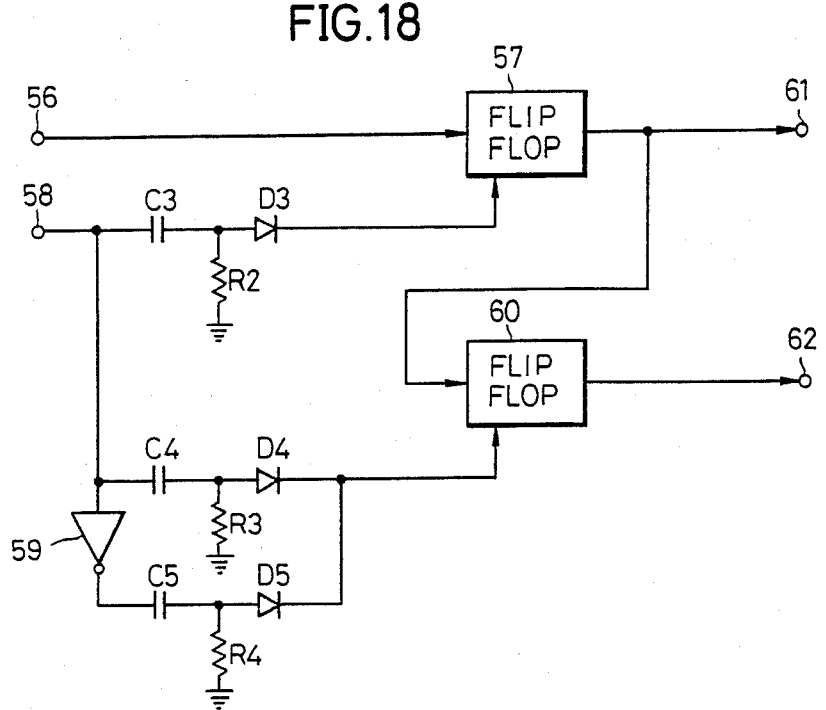
FIG. 18 is a system circuit diagram showing an essential part of the third embodiment of an insert recording system for a video signal according to the present invention.
Figure 19:
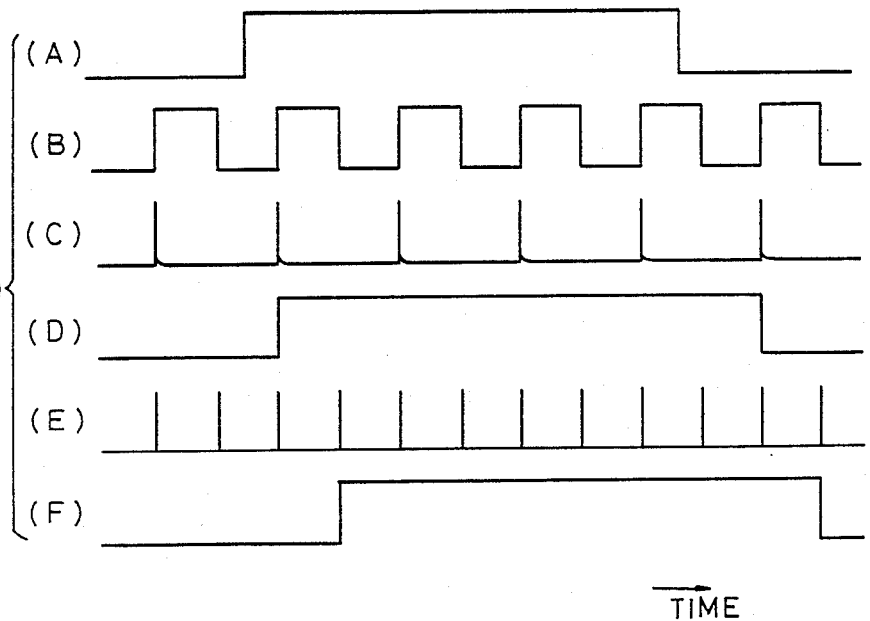
FIGS. 19(A) through 19(F) respectively are time charts for explaining the operation of the circuit system shown in FIG. 18.

Description will now be given with respect to an embodiment in which these disadvantages have been overcome. In FIG. 18, an insert recording instruction signal having a waveform shown in FIG. 19(A) is applied to an input terminal 56. The signal from the input terminal 56 is applied to a data input terminal of a delay type flip-flop 57. A head switching signal having a waveform shown in FIG. 19(B), for obtaining a continuous reproduced signal from the video heads H1 and H2, is applied to an input terminal 58. This head switching signal passes through a differentiating circuit comprising a capacitor C3 and a resistor R2, and further passes through a diode D3 and formed into a differentiated pulse shown in FIG. 19(C). This differentiated pulse is supplied to the flip-flop 57 as a clock pulse. The flip-flop 57 delays the above insert recording instruction signal, in synchronism with the differentiated pulse signal, and generates an erasure control signal shown in FIG. 19(D). This erasure control signal rises when the insert recording instruction signal is supplied to the input terminal 56 and switching is performed to obtain the first output signal from the video head H1 or H2, and falls when the supply of the insert recording instruction signal is interrupted and switching is performed to obtain the first output signal from the video head H1 or H2. The erasure control signal is applied to an erasing current oscillator (not shown) through an output terminal 61, to generate an erasing current during the high-level period of the erasure control signal.

The above head switching signal is passed through a capacitor C4, a resistor R3, and a diode D4, and formed into a pulse having the same waveform as the differentiated pulse shown in FIG. 19(C). This pulse obtained from the diode D4 is supplied to a clock terminal of a delay type flip-flop 60 as a clock signal. On the other hand, the head switching signal is inverted at an inverter 59, and then passed through a capacitor C5, a resistor R4, and a diode D5. The pulse thus obtained from the diode D5 is in phase synchronism with the fall in the head switching signal shown in FIG. 19(B). This pulse from the diode D5 is also supplied to the clock terminal of the flip-flop 60 as a clock pulse. As a result, a pulse signal shown in FIG. 19(E) is supplied to the clock terminal of the flip-flop 60. The flip-flop 60 delays the erasure control signal shown in FIG. 19(D) in synchronism with the pulse signal shown in FIG. 19(E), to generate a signal shown in FIG. 19(F). The signal thus generated from the flip-flop 60 is in phase synchronism with the rise or fall in the head switching signal, and is produced from a terminal 62 as an insert recording control signal. During the high-level period of this insert recording control signal, the video heads H1 and H2 are supplied with the new video signal which is to be recorded by insert recording. On the other hand, during the low-level period of the insert recording control signal, a gate circuit (not shown) is controlled so that the supply of the recording signal to the video heads H1 and H2 is interrupted. Accordingly, regardless of the timing of the insert recording instruction, the insert recording is performed so that the new video signal is recorded from the beginning of a field and the insert recording is completed at the termination point of a field.

Figure 20:
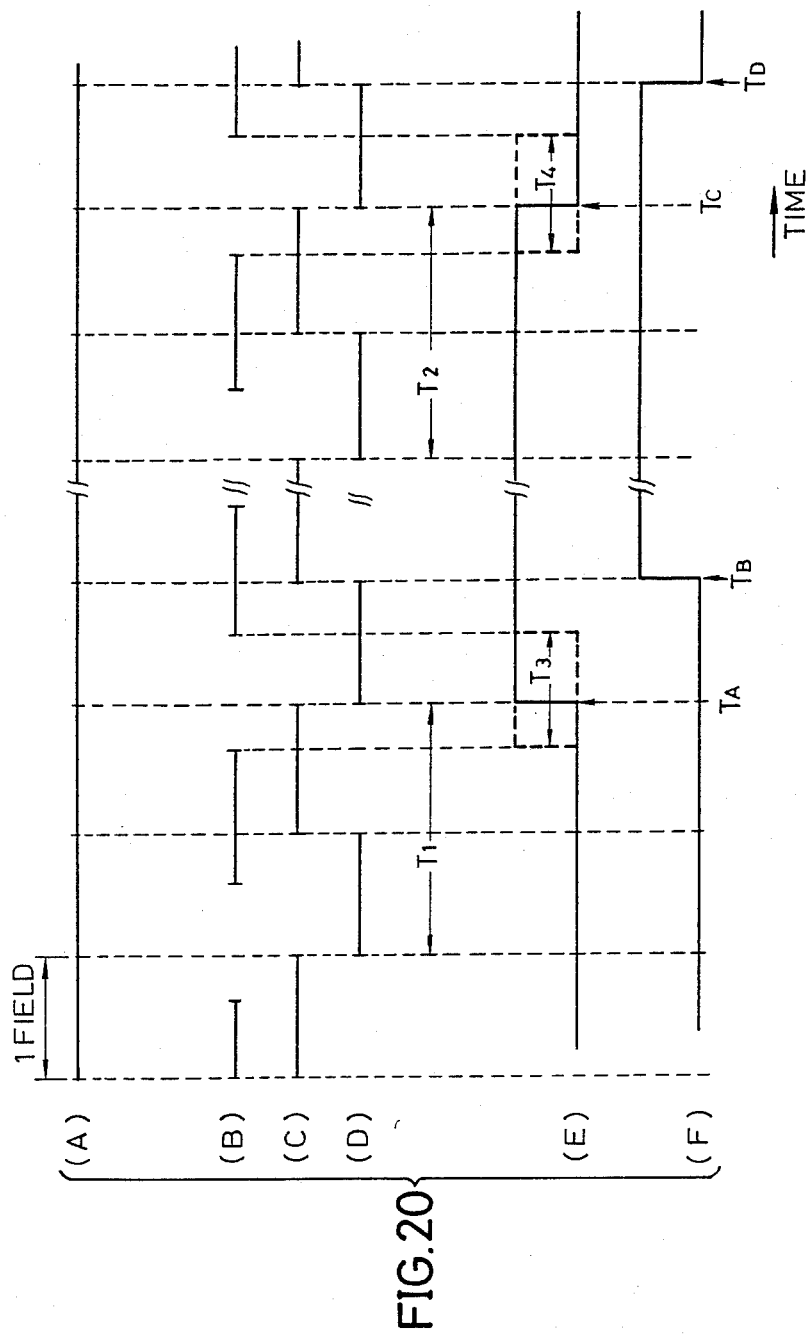
FIGS. 20(A) through 20(F) respectively are time charts for explaining the operation of each part of the third embodiment of an insert recording system for a video signal according to the present invention.

Further description will hereinafter be given by referring to FIGS. 20(A) through 20(F). FIG. 20(A) shows fields of the video signal which is recorded on the magnetic tape 39. FIG. 20(B) shows periods in which the flying erase head Hc makes contact with the magnetic tape 39. FIGS. 20(C) and 20(D) respectively show periods in which the video head H1 of a first channel and the video head H2 of a second channel makes contact with the magnetic tape 39. For example, it is assumed that there is an instruction to start the insert recording within a range indicated by T1 at the lower part of FIG. 20(D). When there is an insert recording start instruction within this range T1, an erasing current is thereafter supplied to the head Hc within a non-contacting period T3 of the head Hc shown in FIG. 20(E) wherein the head Hc does not make contact with the magnetic tape 39. FIG. 20(E) shows the periods in which the supply of the erasing current to the head Hc is permitted or interrupted. In FIG. 20(E), the low-level period indicates that the erasing current is supplied to the head Hc, while the low-level period indicates that the supply of the erasing current to the head Hc is interrupted. Hence, in this case, the supply of the erasing current to the head Hc is started from a time TA when the video head H2 begins to make contact with the magnetic tape 39.

Thereafter, when the head Hc begins to scan over the magnetic tape 39 to effect erasure, the video head H1 begins to make contact with the magnetic tape 39 during this erasure. At a time TB when the video head H1 makes contact with the magnetic tape 39, a control signal (for example, a control signal for operating a recording amplifier or a gate circuit) is generated from the circuit shown in FIG. 18 through the output terminal 62. This control signal is used to effect control so that video signal to be recorded by insert recording is supplied to the video heads H1 and H2. This time TB coincides with the beginning of a field of the video signal. Thus, the video signal which is to be recorded by the insert recording, is recorded by the video head H1 from the beginning of the field. Thereafter, the insert recording tracks are similarly formed by the video heads H1 and H2, as described in conjunction with FIGS. 14(A) through 14(F).

If there is an instruction signal to terminate the insert recording within a range T2 indicated at the lower part of FIG. 20(D), the supply of the erasing current to the head Hc is interrupted within a non-contacting period T4 shown in FIG. 20(E) wherein the head Hc does not make contact with the magnetic tape 39. In the circuit shown in FIG. 18, the supply of the erasing current to the head Hc is interrupted at the rise in the head switching signal shown in FIG. 19(B), that is, when the video head H2 begins to make contact with the magnetic tape 39. Accordingly, FIG. 20(E) indicates that the supply of the erasing current to the head Hc is interrupted at a time TC when the video head H2 begins to make contact with the magnetic tape 39.

The control signal obtained from the output terminal 62 shown in FIG. 18 becomes of low level as shown in FIG. 20(F), at a time TD when the video head H1 begins to make contact with the magnetic tape 39. Hence, at this time TD, the supply of the video signal to the video heads H1 and H2 is interrupted, and the insert recording is completed. This time TD coincides with the terminal point of the field of the video signal. Therefore, the new video signal which is to be recorded by the insert recording, is recorded to the terminal point of the field of the video signal.

According to the present embodiment of the invention, an unrecorded part will not be formed between the recorded video signal and the start and termination points of the insert recording. In addition, overlapped recording will not be performed. Moreover, because the picture does not change in the middle of a field, a fine reproduced picture can be obtained.

Next, description will be given with respect to a modification of an insert recording system according to the present invention. In some recording and reproducing apparatuses, two standard mode recording and reproducing video heads with the same track width and having gaps of mutually different azimuth angles, are provided at the positions of the heads Ha and Hb in FIG. 2, and two triple-speed mode recording and reproducing video heads with a track width equal to approximately ⅓ the track width of the standard mode recording and reproducing video heads and having gaps of azimuth angles respectively the same as the azimuth angles of the gaps in the standard mode recording and reproducing video heads, are provided at the positions of the heads H1 and H2 in FIG. 2. In such a recording and reproducing apparatus, the erasing current is supplied to the standard mode recording and reproducing video heads upon insert recording to operate these standard mode recording and reproducing video heads as flying erase heads, to record the new video signal by the triple-speed mode recording and reproducing video heads while effecting erasure of the recorded video tracks. The insert recording can thus be performed similarly as in the above described case.

The above triple-speed mode recording and reproducing video heads are capable of performing recording and reproduction for a time corresponding to three times the recording and reproducing time of the standard mode recording and reproducing video heads, with respect to a magnetic tape of the same length. In addition, the track width of the triple-speed mode recording and reproducing video heads is approximately ⅓ the track width of the standard mode recording and reproducing video heads which are used as flying erase heads upon insert recording. Accordingly, guard bands are respectively formed between the insert recording tracks. However, this modification has an advantage in that there is no need to independently provide a flying erase head exclusively for erasing, and that the manufacturing cost of the apparatus is reduced.

Further, the present embodiment is not limited to these embodiments, but various variations and modifications may be made without departing from the scope of the present invention.

What is claimed is:

1. An insert recording system for scanning over a magnetic tape which is pre-recorded with a video signal on tracks formed obliquely to the longitudinal direction of the magnetic tape having a track pitch TP, for erasing parts of the pre-recorded tracks, and for recording a different video signal on the erased parts of the pre-recorded tracks, said pre-recorded tracks being successively formed in contiguous contact with each other with essentially no guard band between two adjacent tracks by two video heads having gaps of mutually different azimuth angles, said insert recording system comprising:

first and second video head (H1, H2, 47a, 48a) mounted at mutually opposing positions on a rotary body so that lower ends of the first and second video heads lie on the same plane, said first and second video heads having gaps of mutually different azimuth angles and recording said different video signal with the track pitch TP on the erased parts of the pre-recorded tracks;

a single flying erase head ($H_c$) mounted at a position on the rotary body leading said first video head by $\theta$ radians in a rotating direction of the rotary body so that a lower end of said flying erase head is higher than the lower end of said first video head by a distance h which is described by an equation $h = TP (\theta/\pi)$, said flying erase head having a track width which is two times the track widths of the first and second video heads and having a gap of the same azimuth angle as the gap of said second video head;

erasing current generating means (36, 19) for generating an erasing current;

first control means (11, 12, 35, 41, 44, 51, 54, 56, 57, 58, $C_3$, $R_2$, $D_3$, 61) for controlling supply of said erasing current to said flying erase head; and second control means (13–16, 42, 43 52, $D_1$, $D_2$, $C_2$, 55, 58, 59, $C_4$, $C_5$, $D_4$, $D_5$, $R_3$, $R_4$, 60, 62) for controlling supply of said different video signal to said first and second video heads, so that said first and second video heads successively record said different video signal without a guardband on the erased parts of the pre-recorded tracks erased by said flying erase head.

2. An insert recording system as claimed in claim 1 in which said first control means comprises interrupting means (11, 12, 35, 41, 44, 51, 54) for interrupting the supply of said erasing current to said flying erase head responsive to an incoming insert recording termination signal, said second control means comprises means (13–16, 42, 43, 52, $D_1$, $D_2$, $C_2$, 55) for delaying said insert recording termination signal by a delay time which is required to form a track having a length which is $(1+\theta/\pi)$ times the length of one pre-recorded track, and for continuing the supply of said different video signal to said first and second video heads until said delay time elapses, and said first or second video head continues to record said different video signal on the track having the length which is $(1+\theta/\pi)$ times the length of said one pre-recorded track even after said insert recording termination signal is obtained.

3. An insert recording system as claimed in claim 1 in which said first control means comprises first means (56, 57, 58, $C_3$, $R_2$, $D_3$, 61) supplied with an insert recording instruction signal and a head switching signal which is in phase synchronism with a point when each of said first and second video heads begin to scan over said magnetic tape, said first means starting the supply of said erasing current to said flying erase head from a point in time when one of said first and second video heads begins to scan over said magnetic tape during a non-contacting period after there is an instruction to start an insert recording, said flying erase head being out of contact with said magnetic tape during non-contacting period, said first means interrupting the supply of said erasing current to said flying erase head at a point in time when one of said first and second video heads begins to scan over said magnetic tape during a non-contacting period after there is an instruction to terminate the insert recording, and said second control means comprises second means (58, 59, $C_4$, $C_5$, $D_4$, $D_5$, $R_3$, $R_4$, 60, 62) supplied with said head switching signal and an erasing current control signal from said first control means, said second means starting the supply of said different video signal to said first and second video heads from a point in time corresponding to the beginning of a field of said different video signal after an erasing operation of said flying erase head is started, said second means interrupting the supply of said different video signal to said first and second video heads at a point in time corresponding to a termination point of the field of said different video signal after the erasing operation of said flying erase head is terminated.

4. An insert recording system as claimed in claim 1 in which said erasing current generating means separates a frequency modulated luminance signal from signals reproduced by said first and second video heads, said frequency modulated luminance signal being related to said different video signal.

5. An insert recording system for scanning over a magnetic tape which is pre-recorded with a video signal on tracks formed obliquely to the longitudinal direction of the magnetic tape having a track pitch TP, for erasing parts of the pre-recorded tracks, and for recording a different video signal on the erased parts of the pre-recorded tracks, said pre-recorded tracks being successively formed in contiguous contact with each other with essentially no guard band between two adjacent tracks by two video heads having gaps of mutually different azimuth angles, said insert recording system comprising:

first and second video heads ($H_1$, $H_2$, 47a, 48a) mounted at mutually opposing positions on a rotary body so that lower ends of the first and second video heads lie on the same plane, said first and second video heads having gaps of mutually different azimuth angles and recording said different video signal with the track pitch TP on the erased parts of the pre-recorded tracks;

first and second flying erase heads ($H_a$, $H_b$) mounted at positions on the rotary body leading the respective first and second video heads by $\theta$ radians in a rotating direction of the rotary body so that lower ends of said first and second flying erase head are higher than the lower ends of said first and second video heads by a distance h which is described by an equation $h = TP\ (\theta/\pi)$, said first and second flying erase heads having track widths which are greater than the track widths of the first and second video heads and having gaps of the same azimuth angle;

erasing current generating means (36, 19) for generating an erasing current;

first control means (11, 12, 35, 41, 44, 51, 54, 56, 57, 58, $C_3$, $R_2$, $D_3$, 61) for controlling supply of said erasing current to said first and second flying erase heads; and second control means (13–16, 42, 43 52, $D_1$, $D_2$, $C_2$, 55, 58, 59, $C_4$, $C_5$, $D_4$, $D_5$, $R_3$, $R_4$, 60, 62) for controlling supply of said different video signal to said first and second video heads, so that said first and second video heads successively record said different video signal without a guardband on the erased parts of two successive pre-recorded tracks erased by said first and second flying erase heads, said erased parts of two successive pre-recorded tracks being constituted by one of the two successive tracks and a part of the other of the two successive tracks.

6. An insert recording system as claimed in claim 5 in which said first and second flying erase heads also function as special reproduction heads for performing a special reproduction.

7. An insert recording system as claimed in claim 5 in which said first control means comprises interrupting means (11, 12, 35, 41, 44, 51, 54) for interrupting the supply of said erasing current to said first and second flying erase heads responsive to an incoming insert recording termination signal, said second control means comprises means (13–16, 42, 43, 52, $D_1$, $D_2$, $C_2$, 55) for delaying said insert recording termination signal by a delay time which is required to form a track having a length which is $(1+\theta/\pi)$ times the length of one pre-recorded track, and for continuing the supply of said different video signal to said first and second video heads until said delay time elapses, and said first or second video head continues to record said different video signal on the track having the length which is $(1+\theta/\pi)$ times the length of said one pre-recorded track even after said insert recording termination signal is obtained.

8. An inserted recording system as claimed in claim 5 in which said first and second flying erase heads also function as standard mode recording and reproducing video heads, and said first and second video heads also function as triple-speed mode recording and reproducing heads and perform insert recording.

9. An insert recording system for on a magnetic tape which is pre-recorded with a video signal on tracks formed obliquely to the longitudinal direction of the magnetic tape having a track pitch TP, for erasing parts of the Pre-recorded tracks, and for recording a different video signal on the erased parts of the pre-recorded tracks, said pre-recorded tracks being successively formed in contiguous contact with each other with essentially no guard band between two adjacent tracks by two video heads having gaps of mutually different azimuth angles, said insert recording system comprising:

first and second video heads ($H_1$, $H_2$, 47a, 48a) mounted at mutually opposing positions on a rotary body so that lower ends of the first and second video heads lie on the same plane, said first and second video heads having gaps of mutually different azimuth angles and recording said different video signal with the track pitch TP on the erased parts of the recorded tracks;

first and second flying erase heads ($H_a$, $H_b$) mounted at positions on the rotary body leading the respective first and second video heads by $\theta$ radians in a rotating direction of the rotary body so that lower ends of said first and second flying erase heads are aligned with respect to the lower ends of said first and second video heads, said first and second flying erase heads having track widths which are greater than the track widths of the first and second video heads and having gaps of the same azimuth angle;

erasing current generating means (36, 19) for generating an erasing current;

first control means (11, 12, 35, 41, 44, 51, 54, 56, 57, 58, $C_3$, $R_2$, $D_3$, 61) for controlling supply of said erasing current to said first and second flying erase heads; and second control means (13–16, 42, 43, 52, $D_1$, $D_2$, $C_2$, 55, 58, 59, $C_4$, $C_5$, $D_4$, $D_5$, $R_3$, $R_4$, 60, 62) for controlling supply of said different video signal to said first and second video heads, whereby said first or second flying erase head ($H_a$, $H_b$) affects simultaneously three consecutive tracks, erasing a part of a first track which is pre-recorded or is recorded by said first or second video head, a full area of a second track which is pre-recorded, and a part of a third track which is pre-recorded, and said first or second video head records said different video signal on the erased full area of the second track thereby leaving the erased part of said first track as a guard band, said first and third tracks being adjacent to said second track.

10. An insert recording system as claimed in claim 9 in which said first and second flying erase heads also function as special reproduction heads for performing a special reproduction.

11. An insert recording system as claimed in claim 10 in which said special reproduction heads are constituted by first head gaps of two double gap heads, and said first and second video heads are constituted by second head gaps of the two double gap heads.

12. An insert recording system as claimed in claim 9 in which said first and second flying erase heads also function as standard mode recording and reproducing video heads, and said first and second video heads also function as triple-speed mode recording and reproducing heads and perform insert recording.

13. An insert recording system as claimed in claim 9 in which said erasing current generating means separates a frequency modulated luminance signal from signals reproduced by said first and second video heads, said frequency modulated luminance signal being related to said different video signal.

* * * * *

UNITED STATES PATENT AND TRADEMARK OFFICE
CERTIFICATE OF CORRECTION

PATENT NO. : 4,520,405

DATED : May 28, 1985

INVENTOR(S) : Akihiko Sasaki et al

It is certified that error appears in the above-identified patent and that said Letters Patent is hereby corrected as shown below:

Claim 1, column 15, line 49, change "H1, H2" to -- $H_1$, $H_2$ --.

Claim 3, column 16, line 43, between "during" and "non-" insert --said --.

Claim 9, column 18, line 11, change "on" to -- scanning over --;

Line 15, change "Pre-recorded" to -- pre-recorded --.

Signed and Sealed this

Eleventh Day of August, 1987

Attest:

DONALD J. QUIGG

Attesting Officer

Commissioner of Patents and Trademarks